United States Patent
Thoss et al.

(10) Patent No.: US 11,360,849 B2
(45) Date of Patent: Jun. 14, 2022

(54) METHOD AND MONITORING UNIT FOR CHECKING DATA IN A STORAGE UNIT OR A SYSTEM ON A CHIP

(71) Applicant: Robert Bosch GmbH, Stuttgart (DE)

(72) Inventors: Dieter Thoss, Schwieberdingen (DE); Leonardo Luiz Ecco, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 16/987,767

(22) Filed: Aug. 7, 2020

(65) Prior Publication Data
US 2021/0064464 A1    Mar. 4, 2021

(30) Foreign Application Priority Data
Aug. 27, 2019 (DE) .......................... 102019212813.0

(51) Int. Cl.
| | |
|---|---|
| *G06F 11/00* | (2006.01) |
| *G06F 11/10* | (2006.01) |
| *G06F 11/30* | (2006.01) |
| *G06F 12/02* | (2006.01) |
| *G06F 11/07* | (2006.01) |

(52) U.S. Cl.
CPC ...... *G06F 11/1068* (2013.01); *G06F 11/0787* (2013.01); *G06F 11/1044* (2013.01); *G06F 11/3037* (2013.01); *G06F 12/0246* (2013.01); *G06F 2212/7201* (2013.01)

(58) Field of Classification Search
CPC ......... G06F 11/1048; G06F 2212/1032; G06F 11/1012; G06F 11/1016; G06F 11/1068
See application file for complete search history.

(56) References Cited

U.S. PATENT DOCUMENTS

| | | | | |
|---|---|---|---|---|
| 5,737,342 | A  * | 4/1998 | Ziperovich .... | G01R 31/318516 714/736 |
| 6,662,333 | B1 * | 12/2003 | Zhang ............ | G06F 11/1044 714/767 |
| 7,203,889 | B2 * | 4/2007 | Oza .............. | G06F 11/1044 714/758 |
| 7,831,882 | B2 * | 11/2010 | Tsern ............ | G06F 11/006 714/751 |
| 7,894,282 | B2 * | 2/2011 | Pyo .............. | G11C 11/406 365/200 |
| 9,559,726 | B2 * | 1/2017 | Greenspan ...... | H03M 13/451 |
| 2015/0278017 | A1 * | 10/2015 | Trezise .......... | G11C 29/028 714/764 |
| 2017/0255223 | A1 * | 9/2017 | Bansal ........... | G06F 1/04 |
| 2020/0117565 | A1 * | 4/2020 | Ponnuvel ........ | G06F 11/0793 |

* cited by examiner

*Primary Examiner* — Amine Riad
(74) *Attorney, Agent, or Firm* — Norton Rose Fulbright US LLP; Gerard Messina

(57) ABSTRACT

A method for checking data in a storage unit of a system on a chip; a monitoring unit, which may be activated or deactivated by the system on a chip, being implemented in the system on a chip. When it is activated, the monitoring unit storing error correction codes for executing error correction methods, in the storage unit, such that, for a predefined number of data blocks of the storage unit, in each instance, a data block including an associated error correction code is stored. When access to data in the storage unit is intended to take place, the monitoring unit addresses the respective data and an associated error correction code and checks the addressed data prior to the respective access, using the addressed error correction code, and correcting them when required.

16 Claims, 2 Drawing Sheets

METHOD AND MONITORING UNIT FOR CHECKING DATA IN A STORAGE UNIT OR A SYSTEM ON A CHIP

CROSS REFERENCE

The present application claims the benefit under 35 U.S.C. § 119 of German Patent Application No. DE 102019212813.0 filed on Aug. 27, 2019, which is expressly incorporated herein by reference in its entirety.

FIELD

The present invention relates to a method for checking data in a storage unit of a system on a chip (SoC), as well as to a monitoring unit, a processing unit and a computer program for implementing it.

BACKGROUND INFORMATION

A system on a chip (one-chip system, SoC) is an integrated circuit (IC), in which a plurality of functions of a corresponding system our integrated on a single chip (die). Such SoC's may include an externally connected main memory, for example, a DRAM (dynamic random access memory), as well as a processor unit (processor system part, PS). Such a processor unit may include a useful processor or processor core, or a multicore processor. Multicore processors include a plurality of (at least two) processor cores. A processor core includes at least one arithmetic logic unit (ALU), which constitutes the actual electronic arithmetical element for executing tasks, programs, arithmetic instructions, etc., and in addition, a local memory or buffer memory. This local buffer memory may take the form of a so-called cache memory. For example, this cache memory may include a so-called level-1 cache and, possibly, a level-2 cache. The level-1 cache is mostly a smaller, but more rapid memory. The level-2 cache is, for the most part, larger than the level-1 cache, but often possesses a lower bandwidth and poorer latency time than the level-1 cache.

It may prove suitable to integrate such an SoC in a control unit, in particular, in a control unit of a (motor) vehicle, e.g., an engine control unit or a driving assistance control unit. Due to safety regulations, in particular, in the automotive branch, data may often be required to undergo a check, e.g., the data in the internal and external main memory of the SoC. Such safety regulations are stipulated, for instance, by the standard ISO 26262, in particular, by the so-called automotive safety integrity level (ASIL), a safety requirement level specified by ISO 26262 for safety-related systems in motor vehicles.

Corresponding memory checks may take place, for example, with the aid of so-called error correction methods (error correcting code, ECC). If, for instance, functions of the vehicle that are critical with regard to safety, e.g., driving assistance systems up to autonomous and fully autonomous driving, are executed with the aid of data in the main memory of the SoC, in the case of a fault, the system may not simply switch off, but must continue to function. Required redundancy of the main memory may be ensured, for example, with the aid of suitable error correction methods (ECC).

SUMMARY

The present invention provides a method for checking data in a(n) (internal or external) storage unit of a system on a chip (SoC), as well as a checking unit, a processing unit and a computer program for implementing it. Advantageous refinements of the present application are described herein.

The storage unit may be, in particular, a main memory or working memory of the SoC, in particular, an external DRAM (dynamic random access memory), which is connectible to the SoC via a suitable interface, or a storage device integrated in the SoC. In addition, the SoC includes a processor unit having buffer and/or cache memories.

In accordance with an example embodiment of the present invention, a monitoring unit or monitoring module, which may be activated or deactivated by the system on a chip, is implemented in the system on a chip. This monitoring unit takes the form of, in particular, a hardware unit or a hardware module, which may be integrated in the SoC, in particular, modularly, and may be connected to components of the SoC, for example, as a so-called IP core (intellectual property core, a prefabricated functional block of a chip design, having multiple applications).

For example, the monitoring unit may be activated or deactivated by setting a corresponding bit, for instance, using a bit in an entry of a memory page (page table entry, PTE) of a memory management unit (MMU).

When the monitoring unit is activated, it stores error correction codes (error correcting code, ECC) in the storage unit, in order to execute error correction methods. In this context, for a predefined number of data blocks of the storage unit, in each instance, a data block having an associated error correction code is stored. Accordingly, when the monitoring unit is deactivated, it does not store any error correction codes.

Each stored error correction code is used advantageously for executing an error correction method of the data in the associated number of data blocks. With the aid of such an error correction code, a check of the data in the corresponding data blocks may be carried out advantageously, and in response to a detected error, a correction of the erroneous data may be also be made in an advantageous manner.

The monitoring unit uses, in particular, a portion of the capacity of the storage unit, in order to store code in the storage unit itself, with the aid of which a check of the data stored in the storage unit may be carried out. Thus, error correction codes (ECC) are advantageously stored separately, next to the data, in the storage unit, in particular, in a separate address range.

If access to data in the storage unit is intended to take place, the monitoring unit addresses the respective data and an associated error correction code. Prior to the specific instance of access, the monitoring unit checks the addressed data, using the addressed error correction code, and corrects them as necessary.

Inserting the data blocks having the error correction codes may cause, in particular, address shifts between expected physical memory addresses, under which the memory management unit expects data, and actual physical memory addresses, under which the data in the storage unit are actually stored.

In accordance with an example embodiment of the present invention, the monitoring unit advantageously manages these address shifts. If certain data are intended to be accessed, the monitoring unit arranges these instances of access in an advantageous manner, so that the desired data are addressed so as to have the correct, actual, physical memory addresses. In addition, the monitoring unit addresses the error correction code associated with these data or the corresponding data blocks, as well, which means that the data, along with their addressing, are also subjected to a check and, in some instances, correction.

Thus, within the scope of the present invention, a monitoring unit is provided, which may be integrated in an SoC in a modular manner and may be activated and deactivated flexibly. In accordance with an example embodiment of the present invention, the monitoring unit independently introduces error correction codes needed for the monitoring of data into the storage unit of the SoC and manages address shifts resulting from them. In the case of an instance of data access, the monitoring unit makes connections automatically and transparently and ensures correct addressing and checking of the desired data.

When it is activated, the monitoring unit performs its functions (in particular, introduction of error correction code, the management of address shifts, checking and correcting of data), in particular, autonomously and independently, so that in a particularly advantageous manner, adaptations of the SoC and/or of elements of the SoC, in particular, of buffer and/or cache memories, of a memory management unit (MMU), of a control unit of the main memory (DRAM controller), or of an interconnection system (interconnect) for networking or connecting individual SoC components, are not needed or at least scarcely needed. It is particularly advantageous that adaptations to software of a memory management unit (MMU) are not needed or scarcely needed. Thus, in particular, compatibility, modularity and flexible retrofitting may be rendered possible.

In particular, the monitoring unit may be implemented flexibly at a suitable spot in the SoC. In particular, a type of SoC may be retrofitted in a simple manner to include the modular monitoring unit.

In particular, changes to the elements of the SoC not, or at least scarcely, being necessary. In particular, no upgrading of storage units of the SoC, in particular, of buffer memories, is necessary for implementing the monitoring unit. In one type of SoC, the monitoring unit may be retrofitted, for example, within the scope of a design update. In addition, the monitoring unit may be connected and disconnected flexibly as needed. If, for example, a high degree of safety is not required, then the monitoring unit may be switched off, so that compatibility with the present design of the SoC is retained.

In each instance, the monitoring unit provides, per specific number of data blocks, a data block having error correction code for the respectively associated data blocks. For example, the individual data blocks including error correction codes may be combined in entire memory pages, so that a corresponding number of memory pages having data is followed by, in each instance, a memory page including the associated error codes. The corresponding memory pages having error correction codes (ECC pages) may be positioned advantageously in the storage unit, e.g., all of the ECC pages may be positioned at the beginning or at the end of the storage unit. If they are all positioned together at the end of the storage unit, then there is preferably no address shift between expected and actual physical addresses. However, access is more rapid, if the data blocks and the associated error correction codes are stored on the same memory page (DRAM page).

The number of data blocks, which are each followed by a data block including error correction code, is advantageously selected as a function of a burst size of the SoC. In the course of a so-called burst, data blocks are transmitted as uninterrupted bundles of smaller data units. In particular, burst sizes, that is, the size of the data blocks, which are transmitted as uninterrupted bundles, are standardized, for example, by the so-called JEDEC (Joint Electron Device Engineering Council) Solid State Technology Association (abbreviated as JEDEC), an organization for the standardization of semiconductors.

Burst sizes of 256, 512 or 1024 bits, which corresponds, in particular, to the content of a cache line in the SoC, are mostly provided in storage units, such as conventional DRAM's. In conventional DRAM modules including error correction codes, for example, 64+8 bits may be provided, that is, a 64 bit data block having an 8 bit error correction code, which, e.g., in the case of an 8-time burst, corresponds to 512+64 bits. However, such DRAM modules are ill-suited, in particular, to be used for functions critical with regard to safety in vehicles, since for the most part, the strict safety requirements in the automotive branch, in particular, in accordance with ISO 26262 and ASIL (Automotive Safety Integrity Level) D, may not be satisfied by an 8-bit error correction code.

In the course of the example method, the monitoring unit allows the size of the data blocks for the error correction codes to be selected in such a manner, that safety standards in the automotive branch, in particular, requirements in accordance with ISO 26262 and ASIL D, are also met.

Identification of over 99% of all errors present is advantageously rendered possible by the monitoring unit, in particular, addressing errors and errors in the signal path, as well, and consequently, errors, in particular, in cache memories, memory management units (MMU) and memory protections units (MPU), main memory control units (DRAM controllers), bus interfaces and snoop logic circuits for preventing conflicts between memory and cache contents. It is particularly advantageous that the monitoring unit allows many errors to be corrected in such a manner, that an uncorrectable error is sufficiently improbable.

For example, a 512+128 bit data transmission in the storage unit may be achieved by the monitoring unit; a 128 bit data block for the corresponding error correction codes being provided on data blocks having a size of 512 bits. Using such a 128 bit error correction code, for example, a conventional, commercial DRAM may be used as a storage unit, so that error detection and error correction required under ISO 26262 and ASIL may be rendered possible.

When it is activated, the monitoring unit advantageously translates an expected physical address to an actual physical address, in order to address the data. As explained above, the insertion of the data blocks having the error correction codes may result in address shifts in the storage unit. In particular, only the original physical addresses of the data prior to the address shift, not the actual physical addresses valid after the address shift, are known to the SoC, in particular, to a memory management unit MMU. As explained above, the monitoring unit manages the address shift and, in the course of it, translates the expected physical addresses into the actual physical addresses. Consequently, it is advantageous that no changes to the SoC and its software are necessary, and still, compatibility of the monitoring unit is ensured. When it is not activated, the monitoring unit advantageously does not translate any addresses.

A memory management unit (MMU) of the SoC preferably transmits the expected physical address to the monitoring unit. This MMU is advantageously provided for managing the data in the storage unit. In response to a request of the processor unit of the SoC to access certain data in the storage unit, the memory management unit retrieves the desired data from the storage unit in a conventional manner, in accordance with the physical addresses. However, since these physical addresses no longer have to be correct after the address shift, in the course of the method, the memory management unit preferably transmits the access request and, therefore, the physical addresses, to the monitoring unit.

The expected physical address is preferably translated by the monitoring unit into the actual physical address as a function of the predefined number of data blocks, for which, in each instance, a datablock having an associated error correction code is stored, and as a function of a size of a data block and a physical memory address of the error correction code. In accordance with suitable relationships, the monitoring unit advantageously inserts additional main memory areas for the error correction codes into the physical address space of the storage unit.

According to a particularly advantageous specific example embodiment of the present invention, the predefined number of data blocks, for which, in each instance, a data block having an associated error correction code is stored, is a power of two. Thus, for the number N of data blocks, then, preferably, $N=2^n$, where n is a natural number. In each instance, a size of the error correction codes ECC is advantageously a fraction of 512 bits that is a power of two, particularly advantageously, 64 bits, 128 bits or 256 bits. For example, in the case of a data transmission of 512+64 bits (that is, a 64 bit ECC data block is provided per 512 bits of data blocks), in each instance, N=8 data pages may be followed by one page having an error correction code ECC. In the case of 512+128 bits, for example, N=4 data pages may be followed, in each instance, by one ECC page. The pages for the error correction code may be positioned effectively in the storage unit, for example, all at the beginning or all at the end of the storage unit.

It is also possible for the number N of data blocks, for which, in each instance, one ECC data block is stored, to be selected as $N=2^n-1$. In this case, a simpler translation of the physical addresses into the actual addresses is yielded in comparison with N=2n, but in return, the storage space of the ECC page is not utilized as completely as in the case of $N=2^n$.

The error correction codes ECC may also advantageously be not a whole fraction of a cache line that is a power of two. This case may be useful, in particular, in connection with $N \neq 2^n$.

The monitoring unit is advantageously connected between a level-1 buffer memory or cache memory (L1 cache) and a level-2 buffer memory or cache memory (L2 cache) of the system on a chip. In addition, the monitoring unit is preferably connected between a memory management unit MMU and the level-2 buffer memory. In this context, in addition to the checking of the main memory, the monitoring unit is provided, in particular, for protecting further components, such as a level-3 buffer memory (L3 cache), a control unit of the main memory (DRAM controller), as well as corresponding circuit wiring.

In accordance with an example embodiment of the present invention, the monitoring unit preferably includes a code unit, which generates the error correction code for the predefined numbers of data blocks. In addition, the monitoring unit advantageously includes a main unit, which is connected to the code unit so as to be able to transmit data. The main unit is configured, in particular, to address, read in, monitor, correct and route data into and/or out of the storage unit. The code unit preferably generates the error correction codes with reference to the expected physical addresses of the specific data blocks. Consequently, not only incorrect data, but also, advantageously, wrong instances of addressing correct data, may be detected, using the error correction codes.

The code unit is preferably connected between the level-1 buffer memory and the level-2 buffer memory. Alternatively, the code unit may advantageously be connected between a processor unit of the system on a chip and the level-1 buffer memory, as well. In this case, the error correction codes may advantageously be generated and evaluated between a bus master and the level-1 cache. Therefore, in particular, the level-1 cache and the memory management unit MMU may also be protected, so that, advantageously, no additional protection of these components is necessary. In this case, the main unit of the monitoring unit is advantageously connected between the level-1 buffer memory and the level-2 buffer memory and connected to the code unit accordingly.

The monitoring unit preferably includes a buffer memory. Thus, the monitoring unit advantageously includes a separate, internal buffer memory or cache memory. The monitoring unit may advantageously access error correction codes rapidly via this internal buffer memory. In each cache line, this internal buffer memory includes, in particular, N ECC's, which yield, all together, a block size of, advantageously, 512 bits, which are transferred per burst from the level-2 cache of the SoC to the storage unit, or the other way around.

Alternatively, or in addition, the monitoring unit preferably uses a portion of a buffer memory of the system on a chip, in particular, a portion of the level-1 buffer memory. In this case, in particular, the monitoring unit may be constructed in a less complex manner. The ECC's are then, in particular, part of the level-1 cache lines.

The system on a chip is used particularly advantageously in a vehicle, in particular, in a control unit of the vehicle, e.g., in a driving assistance control unit. In particular, the SoC may be intended for executing functions of the vehicle that are critical with regard to safety, e.g., of driving assistance systems up to autonomous and fully autonomous driving. Using the monitoring unit, and by checking the data in accordance with the present method, the safety regulations of the automotive branch may be advantageously complied with, in particular, regulations according to ISO 26262 and the Automotive Safety Integrity Level (ASIL). In particular, it may be ensured that the SoC does not switch off in the case of a fault, but continues to function.

In accordance with an example embodiment of the present invention, a monitoring unit of the present invention is configured with regard to software and/or hardware to implement a method of the present invention and/or includes devices for implementing a method of the present invention, in particular, devices for generating error correction codes for data to be stored in the storage unit, devices for storing the error correction codes in the storage unit, devices for outputting data requested from the storage unit, and devices for executing a method for correcting errors of the data requested from the storage unit on the basis of the error correction code.

In accordance with an example embodiment of the present invention, a processing unit of the present invention, in particular, a system on a chip, includes a monitoring unit of the present invention activatable and deactivatable, in particular, using a memory entry (e.g., page table entry). It further includes an (internal) storage unit and/or an interface for connecting an (external) storage unit.

In accordance with an example embodiment of the present invention, the implementation of a method of the present invention in the form of a computer program or computer program product including program code for executing all of the method steps is also advantageous, since this generates only minor costs, in particular, when an executing control unit is still used for further tasks and is therefore present already. Suitable storage media for supplying the computer program include, in particular, magnetic, optical and electrical storage devices, such as hard disks, flash memories, EEPROM's, DVD's, inter alia. A download of a program via computer networks (Internet, intranet, etc.) is also possible.

Further advantages and refinements of the present invention are derived from the description herein and the figures.

The present invention is represented schematically in the figures in light of exemplary embodiments and is described below with reference to the figures.

DETAILED DESCRIPTION OF EXAMPLE EMBODIMENTS

Figure 1:
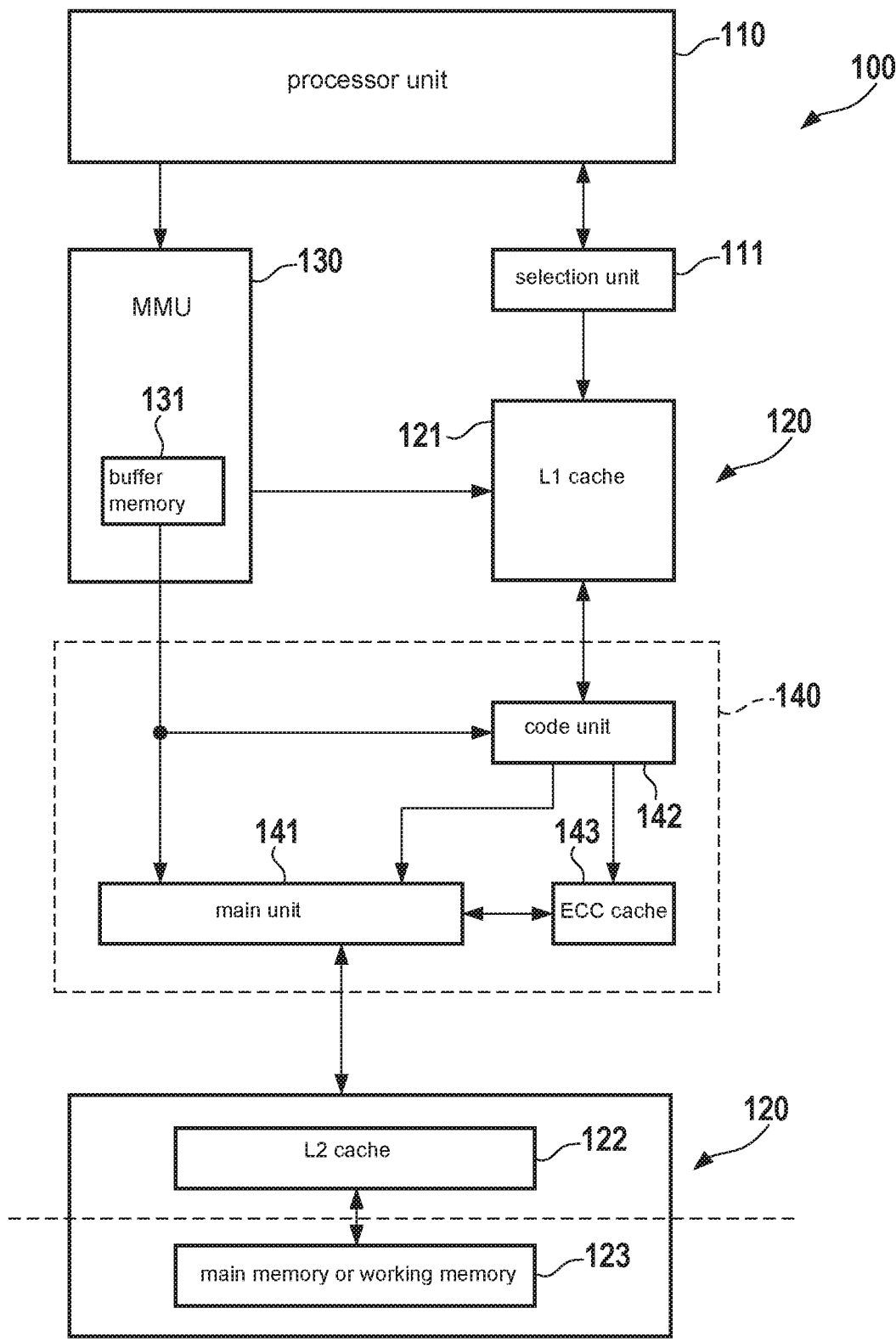
FIG. 1 schematically shows a system on a chip, which is configured to implement a preferred specific example embodiment of a method according to the present invention.

A system on a chip SoC, which is configured to implement a preferred specific example embodiment of a method according to the present invention, is represented schematically and denoted by 100 in FIG. 1. SoC 100 is used, for example, in a control unit of a vehicle, e.g., in order to execute vehicle functions critical with regard to safety, for instance, in the course of autonomous driving.

Here, the SoC 100 includes a processor unit 110 taking the form of a multicore processor, as well as storage units 120, in particular, a level-1 buffer memory or cache memory 121 (L1 cache), a level-2 buffer memory or cache memory 122 (L2 cache), and a main memory or working memory 123 taking the form of a DRAM (dynamic random access memory). As indicated by the dashed line, it may also be an external working memory 123, which is connected to the SoC via a corresponding interface.

A memory management unit (MMU) 130 is provided, in order to make connections between processor unit 110 and storage units 122, 123. For addressing storage modules or data blocks of these storage units 122, 123, processor unit 110 knows, in particular, only a virtual address or logical address, but not physical addresses, with the aid of which storage modules are controlled. Memory management unit MMU 130 is used, in particular, to translate a logical address to physical addresses.

In particular, memory management unit 130 always allows processor unit 110 to address memory at or above, e.g., address 0, without knowledge of the actual physical address. Since memory management unit 130 is usually reconfigured in response to a change of task, each individual task may use, in particular, the same starting address. This is also advantageously true for data. In addition, memory management unit 130 decouples, in particular, the main memory areas of the tasks from each other. In this context, in particular, each task may only see "its" memory. However, main memory areas of a plurality of tasks may also be split, e.g., code of libraries or data for exchange.

To ascertain the physical address from the logical address, memory management unit 130 uses, in particular, a table having the necessary data. This is advantageously in the specific storage unit, in particular, in main memory DRAM 123. A portion of this table may be cached in a buffer memory 131, a so-called translation lookaside buffer (TLB). This speeds up the work of memory management unit 130 considerably. The translation of the addresses may take place in pages of a fixed size, e.g., 4 kilobytes. For each such page, there is a page table entry (PTE), which may contain, in addition to the physical address of the page in the memory, further information, as well, e.g., if the page is intended to be cached, if there is write-protection, etc.

Level-1 buffer memory 121 normally stores 512 bits in a cache line. Code is read in by processor unit 110, mostly in blocks (e.g., 512 bits, as well), and is then decoded for the out-of-order execution. On the other hand, instances of accessing data may vary considerably. For example, signal processing commands may process up to 1024 bits concurrently, whereas single bytes or even bits may also be manipulated. A logic circuit in the form of a selection unit 111 ("byte/word select") is provided, in order to be able to read or write only fractions of a cache line.

A monitoring unit 140, which is configured, in particular, with regard to software and/or hardware, to implement a preferred specific example embodiment of a method according to the present invention, is provided for checking data in storage units of the SoC.

Monitoring unit 140 is advantageously formed in a modular manner and may be implemented at a suitable place in SoC 100, which means that, in particular, changes or adjustments to the remaining components of SoC 100 are not needed or at least scarcely needed. In particular, no upgrading of storage units 121, 122, 123 is necessary. In addition, monitoring unit 140 carries out its functions autonomously and independently, so that, in particular, adaptations to software of memory management unit 130 are also not needed or at least scarcely needed.

As shown in FIG. 1, monitoring unit 140 may be connected advantageously between level-1 buffer memory 121 and level-2 buffer memory 122.

Monitoring unit 140 may be activated or deactivated by SoC 100, for instance, by setting a corresponding bit in an entry of a memory page (page table entry, PTE) of memory management unit 130.

When monitoring unit 140 is activated, it stores error correction codes (error correcting code, ECC) in the storage unit, in particular, main memory 123, in order to execute error correction methods. For a predefined number of data blocks of storage unit 123, in each instance, a data block having an associated error correction code ECC is stored.

If access to data in storage unit 123 is intended to take place, the specific data and an associated error correction code are addressed by monitoring unit 140. Prior to the specific instance of access, the addressed data are checked by monitoring unit 140, using the addressed error correction code, and corrected, if necessary.

For example, monitoring unit 140 may include a main unit 141, a code unit 142 and a separate buffer memory 143 (ECC cache). Code unit 142 is provided for generating the error correction codes, in particular, with reference to the physical addresses of the specific data blocks, communicated by memory management unit 130, so that in addition to erroneous data, incorrect instances of addressing correct data may also be detected in an advantageous manner. Main unit 141 is provided, in particular, for addressing, reading in, monitoring, correcting and routing data. In particular, it may insert additional writing or reading operations, in order to load ECC data into ECC cache 143 or move ECC data out of ECC cache 143. This then takes place advantageously, when no requests from L1 cache 121 are present and access to main memory 120 is possible without a collision. A further task of unit 141 is the translation of the addresses, as described below.

With the aid of the buffer memory, that is, ECC cache 143, monitoring unit 140 may access error correction codes rapidly. This ECC cache 143 contains, in particular, in each cache line, N ECC's, which yield, together, a block size of, e.g., 512 bits, which are then transferred per burst from or to level-2 cache 122 or to DRAM 123.

Due to the insertion of the data blocks having the error correction codes, in particular, address shifts may be generated, which means that the actual physical addresses in storage unit 120 are different from the physical addresses of the individual data or data blocks transmitted or expected by memory management unit 130. In particular, only the original physical addresses continue to be known to memory management unit 130. Monitoring unit 140 manages these address shifts and translates the expected physical addresses into the actual physical addresses.

The expected physical address is preferably translated into the actual physical address as a function of the predefined number N of data blocks, for which, in each instance, a datablock having an associated error correction code is stored, and as a function of the memory address or position of the error correction code and a size G of a data block. It is particularly advantageous that the predefined number N of data blocks, for which, in each instance, a data block having an associated error correction code is stored, is a power of two, so that $N=2^n$ with n being a natural number.

If, in this case, for a number of $N=2^n$, in each instance, a data block including error correction code is provided directly behind the N data blocks, and if each data block has a size G in bytes, in particular, the following relationships (each in C notation) are yielded:

$$A_{BLOCK} = (A_{PHYS} \& (-N*G)) + ((A_{PHYS} \& (-N*G)) >> ld(N))$$
$$A_{off} = A_{PHYS} \& ((-N*G)-1)$$

$$A_{DATA} = A_{PHYS} + ((A_{PHYS} \& (-N*G)) >> ld(N))$$
$$A_{ECC} = A_{BLOCK} + N*G + A_{off} >> ld(N)$$

where:
N is the number of ECC's, which fit in a cache line=the number of data blocks, which are followed by an ECC block;
G is the size of a data block in bytes;
$A_{PHYS}$ is the physical address expected, in particular, by memory management unit 130;
$A_{DATA}$ is the actual physical address of the data in the storage unit, which belong to $A_{PHYS}$;
$A_{ECC}$ is the address of the error correction code ECC, which belongs to $A_{PHYS}$;
$A_{BLOCK}$ is an auxiliary value, in particular, the address of the N+1 pages of the data block;
$A_{off}$ is an auxiliary value, in particular, an offset within the N+1 pages of the data block; and
ld(x) is the logarithm base 2.

According to these relationships, monitoring unit 140 advantageously inserts additional main memory areas for the error correction codes into the physical address space of the storage unit, e.g., main memory 123 or L2 cache 122. In particular, an address relationship of $A_{DATA}=A_{PHYS}$ is only true for a first data area. In the storage unit, all of the other data areas are, in particular, offset due to the additional ECC data blocks, which means that $A_{DATA} > A_{PHYS}$ applies to these data areas.

If monitoring unit 140 is not activated, in particular, due to the corresponding bit in the PTE of MMU 130, then, in particular, no address translation takes place, so $A_{DATA}=A_{PHYS}$.

In particular, monitoring unit 140 may be activated and deactivated by page, so that individual data pages are protected and others are not. If not all of the corresponding data pages in front of an ECC page are protected by monitoring unit 140, this results, in particular, in only portions of the ECC page being used and storage space being wasted. It is therefore useful to store or not store all of the associated data pages in front of an ECC page, using monitoring unit 140. If not, then the ECC page is advantageously completely free. When monitoring unit 140 is switched on, then, it may also not be used due to the address translation from $A_{PHYS}$ to $A_{DATA}$. However, when monitoring unit 140 is switched off, such a free ECC page may advantageously be used by MMU 130 within an unprotected main memory area.

The size G of the individual data blocks may also contain, in particular, a plurality of pages, advantageously, a power of two. A very large G may have the result that only a region including all of the ECC's still lies at the end of the storage unit, and that the addresses of data lying in front of it may be passed through 1:1 without translation.

However, G is advantageously selected to be not much larger than a memory page, in order to attain a high degree of locality of the data in the storage unit. When data and associated ECC's fit in a single DRAM page (in contrast to memory pages of the MMU), then this expedites access considerably. If such a high degree of locality and such expedited access is not necessary, it may be useful to select G to be large enough to obtain a 1:1 data area that is as large as possible.

If certain data are supposed to be accessed, processor unit 110 transmits a corresponding request including the specific, virtual addresses to memory management unit 130. As a result, memory management unit 130 translates these virtual addresses into the respective physical addresses and relays a corresponding request to monitoring unit 140. Monitoring unit 140 translates the (expected) physical addresses, in turn, into the actual physical addresses and addresses the corresponding data and the associated error correction codes in accordance with these actual physical addresses. The correspondingly checked and, in some instances, corrected data are then transmitted by monitoring unit 140 to level-1 buffer memory 121.

The access to the data may be read-access or also write-access. The data may be, in particular, data values, e.g., measured values or control values, or also code to be executed. Level-1 buffer memory 121 includes, for example, an instruction cache (L1I cache) for data in the form of executable code, as well as a data cache (L1D cache) for data in the form of data values.

In this context, read access to a code may proceed, for example, as follows:

Processor unit 110 fills a prefetch buffer with the aid of access to the level-1 instruction cache (L1I cache). Since processor unit 110 and the L1I cache lie in front of monitoring unit 140, these are not protected by it and advantageously include separate measures for increasing safety, such as a lockstep for processor unit 110 and a cyclical redundancy check (CRC) for the L1I cache.

In the case of an L1I cache hit, the access ends here, and corresponding data of the L1I cache is accessed. At the same time as the L1I access, MMU 130 ascertains the physical memory address and, in the case of an L1I cache miss, passes this on to monitoring unit 140.

Monitoring unit 140 converts the expected physical address into the actual physical address and passes the read access on to level-2 cache 122. Monitoring unit 140 simultaneously searches for the associated error correction code ECC in ECC cache 143.

In response to a cache hit, monitoring unit 140 checks the data from level-2 cache 122 and, if applicable, transmits them in corrected form to the L1I cache. In response to a cache miss, monitoring unit 140 initiates a further instance of level-2 cache read access for these and N−1 further ECC's and executes the check/correction upon their appearance.

Read access to data values may proceed, in particular, analogously to an instance of code read access; in particular, the L1 data cache (L1D cache) being used. In contrast to the L1I cache, which is protected, for example, with the aid of a cyclical redundancy check CRC, in particular, an error correction code ECC may be used for protecting the L1D cache, in order that written data, which have not yet reached main memory 123, may be corrected if necessary. In addition, the access may include different word lengths (1, 8, 16, 32, 64, 128, 256 bits), which the L1D cache may process.

Write access to data values may proceed, in particular, as follows:

Processor unit 110 writes data having corresponding word lengths (e.g., 1, 8, 16, 32, 64, 128 bits) to the L1 data cache. In the case of an L1D cache hit, the sequence advantageously ends here. The cache line is marked, in particular, as "dirty," which indicates that this cache block has been changed.

Using the L1D access, MMU 130 ascertains the physical memory address and, in the case of an L1D cache miss, passes this on to monitoring unit 140. Monitoring unit 140 translates the expected physical address into the actual physical address and the associated ECC address.

Monitoring unit 140 initially fetches the data and/or the ECC from L2 cache 122 in a manner analogous to the above description of the read access. In this context, monitoring unit 140 may initially write, in particular, another L1D cache line and/or ECC cache line. As an alternative, a corresponding L1D cache line and/or ECC cache line may also already be written preventatively and not only just at this juncture. After the writing, the cache line may be overwritten with other data from a different address.

The desired cache line is fetched, in particular, in L1 cache 121, and the associated cache line including the ECC is fetched in ECC cache 143. After these data are now available, the data cache line is modified according to the write request of processor unit 110 U, and the associated ECC is recalculated in the corresponding ECC cache line. The two cache lines are advantageously marked as "dirty," in order to indicate that these have been changed.

ECC cache 143 has, in particular, a size, which may be between 5% and 10% of the size of L1 cache 121. Since, in particular, only ECC's, and not the data themselves, are stored in this ECC cache 143, ECC cache 143 may be, in particular, N times smaller than L1 cache 121. In addition, since ECC cache 143 stores N ECC's in each cache line, a cache miss is less likely than in L1 cache 121. The degree of locality of the ECC's is, in particular, greater than that of the associated data by a factor of N. This increases the probability that they are located on a lower, more rapid cache level than the associated data. Thus, the additional latency from an ECC cache miss is, on average, less than that of the data, which is why the miss rate of ECC cache 143 may be greater than that of L1 cache 121.

Alternatively, it is also possible for monitoring unit 140 not to have a separate buffer memory 143, but to use a portion of a buffer memory of SoC 100, as explained below with reference to FIG. 2.

Figure 2:
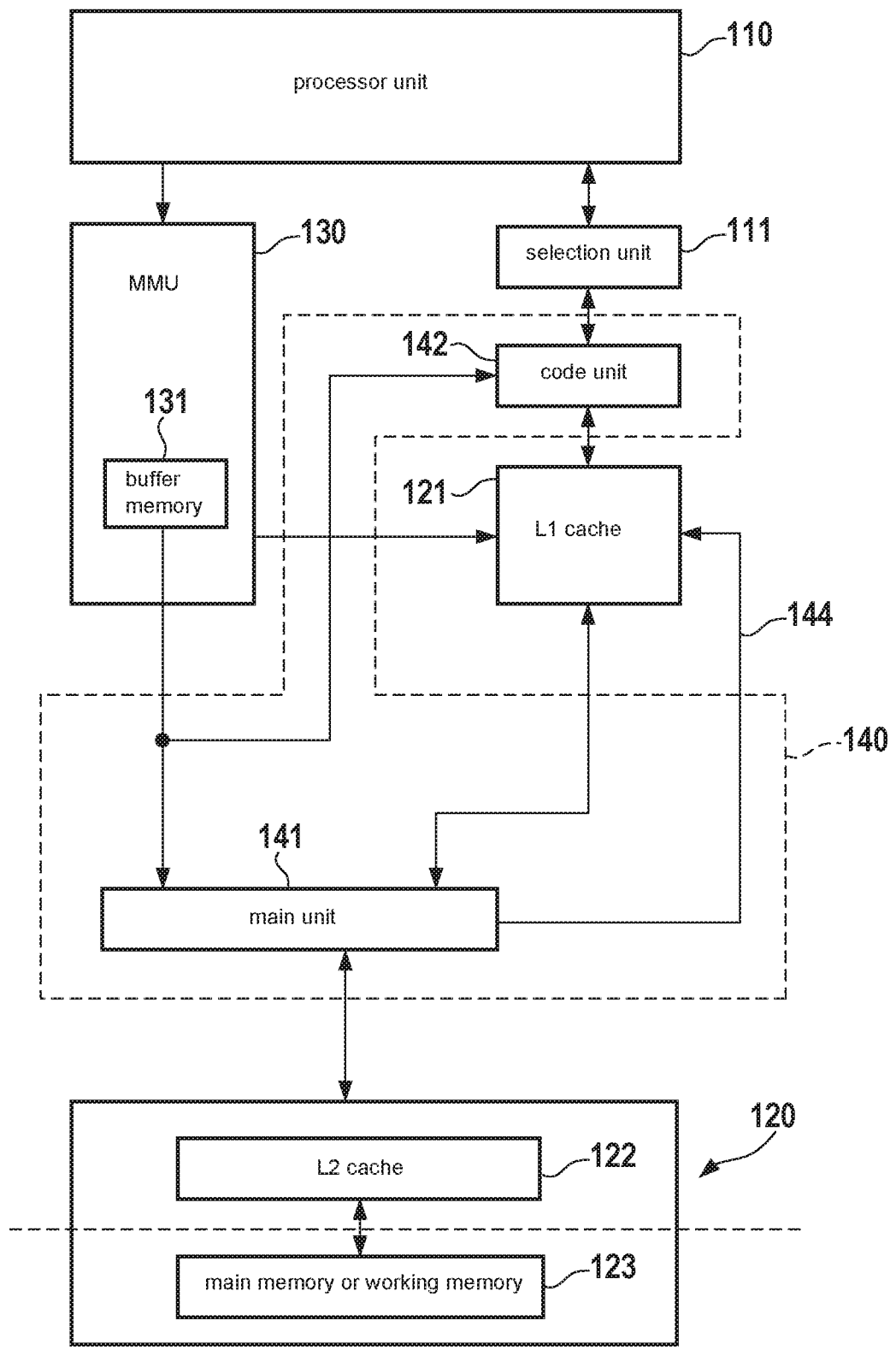
FIG. 2 schematically shows a system on a chip, which is configured to implement a preferred specific example embodiment of a method according to the present invention.

FIG. 2 shows a corresponding system on a chip schematically, where identical reference numerals in FIGS. 1 and 2 denote the same or equally acting elements.

As shown in FIG. 2, in this case, monitoring unit 140 includes only main unit 141 and code unit 142. As indicated by reference numeral 144, monitoring unit 140 uses a portion of level-1 buffer memory 121 as a cache.

In addition, in this case, code unit 142 is connected between processor unit 110 and level-1 buffer memory 121, in particular, between selection unit 111 and L1 cache 121.

In this case, the ECC's are generated and evaluated by code unit 142, between a bus master and L1 cache 121. In this case, main unit 141 assumes, in particular, the storing and fetching-out of the ECC's in the separate address ranges.

In this case, the signal path may also be protected in front of main unit 141, in particular, in front of L1 cache 121 and MMU 130, so that separate protection of L1 cache 121 is no longer necessary.

What is claimed is:

1. A method for checking data in a storage unit of a system on a chip, a monitoring unit, which is activated or deactivated by the system on a chip, being implemented in the system on a chip, the method comprising the following steps:
   storing, by the monitoring unit when the monitoring unit is activated, error correction codes for executing error correction methods, in the storage unit, such that, for a predefined number of data blocks of the storage unit, a data block including an associated error correction code is stored;
   addressing, by the monitoring unit when access to respective data in the storage unit is intended to take place, the respective data and an associated error correction code; and
   checking, by the monitoring unit, the addressed data prior to the access, using the addressed error correction code, and correcting, by the monitoring unit, the addressed data when required, wherein the monitoring unit is connected between a level-1 buffer memory of the system on a chip and a level-2 buffer memory of the system on a chip.

2. The method as recited in claim 1, wherein to address the respective data, the monitoring unit translates an expected physical address into an actual physical address.

3. The method as recited in claim 2, wherein a memory management unit of the system on a chip transmits the expected physical address to the monitoring unit.

4. The method as recited in claim 2, wherein the expected physical address is translated into the actual physical address as a function of the predefined number of data blocks, for which, the data block having the associated error correction code is stored, as a function of a physical memory address of the associated error correction code, and as a function of a size of a data block.

5. The method as recited in claim 1, wherein the predefined number of data blocks, for which the data block having the associated error correction code is stored, is a power of two.

6. The method as recited in claim 1, wherein the monitoring unit is connected between a memory management unit of the system on a chip and the level-2 buffer memory.

7. The method as recited in claim 1, wherein the monitoring unit includes a code unit, which generates the error correction codes for the predefined numbers of data blocks with reference to physical addresses of the data blocks.

8. The method as recited in claim 1, wherein the monitoring unit further includes a buffer memory and/or uses a portion of a buffer memory of the system on a chip.

9. The method as recited in claim 1, wherein the monitoring unit uses a portion of a level-1 buffer memory of the system on a chip.

10. The method as recited in claim 1, wherein the system on a chip is used in a vehicle.

11. A method for checking data in a storage unit of a system on a chip, a monitoring unit, which is activated or deactivated by the system on a chip, being implemented in the system on a chip, the method comprising the following steps:
  storing, by the monitoring unit when the monitoring unit is activated, error correction codes for executing error correction methods, in the storage unit, such that, for a predefined number of data blocks of the storage unit, a data block including an associated error correction code is stored;
  addressing, by the monitoring unit when access to respective data in the storage unit is intended to take place, the respective data and an associated error correction code; and
  checking, by the monitoring unit, the addressed data prior to the access, using the addressed error correction code, and correcting, by the monitoring unit, the addressed data when required, wherein:
    the monitoring unit includes a code unit, which generates the error correction codes for the predefined numbers of data blocks with reference to physical addresses of the data blocks, and
    the code unit is connected between a level-1 buffer memory of the system on a chip and a level-2 buffer memory of the system on a chip, or between a processor unit of the system on a chip and the level-1 buffer memory.

12. A monitoring unit for checking data in a storage unit of a system on a chip, the monitoring unit, which is activated or deactivated by the system on a chip, being implemented in the system on a chip, the monitoring unit configured to:
  store, when the monitoring unit is activated, error correction codes for executing error correction methods, in the storage unit, such that, for a predefined number of data blocks of the storage unit, a data block including an associated error correction code is stored;
  address, when access to respective data in the storage unit is intended to take place, the respective data and an associated error correction code; and
  check addressed data prior to the access, using the addressed error correction code, and correct the addressed data when required, wherein the monitoring unit is connected between a level-1 buffer memory of the system on a chip and a level-2 buffer memory of the system on a chip.

13. A processing unit including a monitoring unit, the monitoring unit being activatable and deactivatable using a memory entry, and being configured for checking data in a storage unit, the monitoring unit including:
  devices configured to generate error correction codes for data to be stored in the storage unit;
  devices configured to store the error correction codes in the storage unit;
  devices configured to output data requested from the storage unit; and
  devices configured to execute a method for correcting errors of the data requested from the storage unit, based on the stored error correction codes, wherein the monitoring unit is connected between a level-1 buffer memory and a level-2 buffer memory.

14. The processing unit as recited in claim 13, wherein the processing unit is a system on a chip.

15. The processing unit as recited in claim 13, wherein the monitoring unit is configured to:
  store, when the monitoring unit is activated, the error correction codes for executing error correction methods, in a storage unit of the processing unit, such that, for a predefined number of data blocks of the storage unit, a data block including an associated error correction code is stored;
  address, when access to respective data in the storage unit is intended to take place, the respective data and an associated error correction code; and
  check addressed data prior to the access, using the addressed error correction code, and correct the addressed data when required.

16. A non-transitory machine-readable storage medium having a computer program for checking data in a storage unit of a system on a chip, a monitoring unit, which is activated or deactivated by the system on a chip, being implemented in the system on a chip, the computer program, when executed by the monitoring unit, causing the monitoring unit to perform the following steps:
  storing, when the monitoring unit is activated, error correction codes for executing error correction methods, in the storage unit, such that, for a predefined number of data blocks of the storage unit, a data block including an associated error correction code is stored;
  addressing, when access to respective data in the storage unit is intended to take place, the respective data and an associated error correction code; and
  checking the addressed data prior to the access, using the addressed error correction code, and correcting the addressed data when required, wherein the monitoring unit is connected between a level-1 buffer memory of the system on a chip and a level-2 buffer memory of the system on a chip.

* * * * *